H. A. DORSEY.
STUMP PULLING AND SKIDDER ATTACHMENT FOR TRACTORS.
APPLICATION FILED OCT. 13, 1920.
1,374,835.
Patented Apr. 12, 1921.
2 SHEETS—SHEET 1.
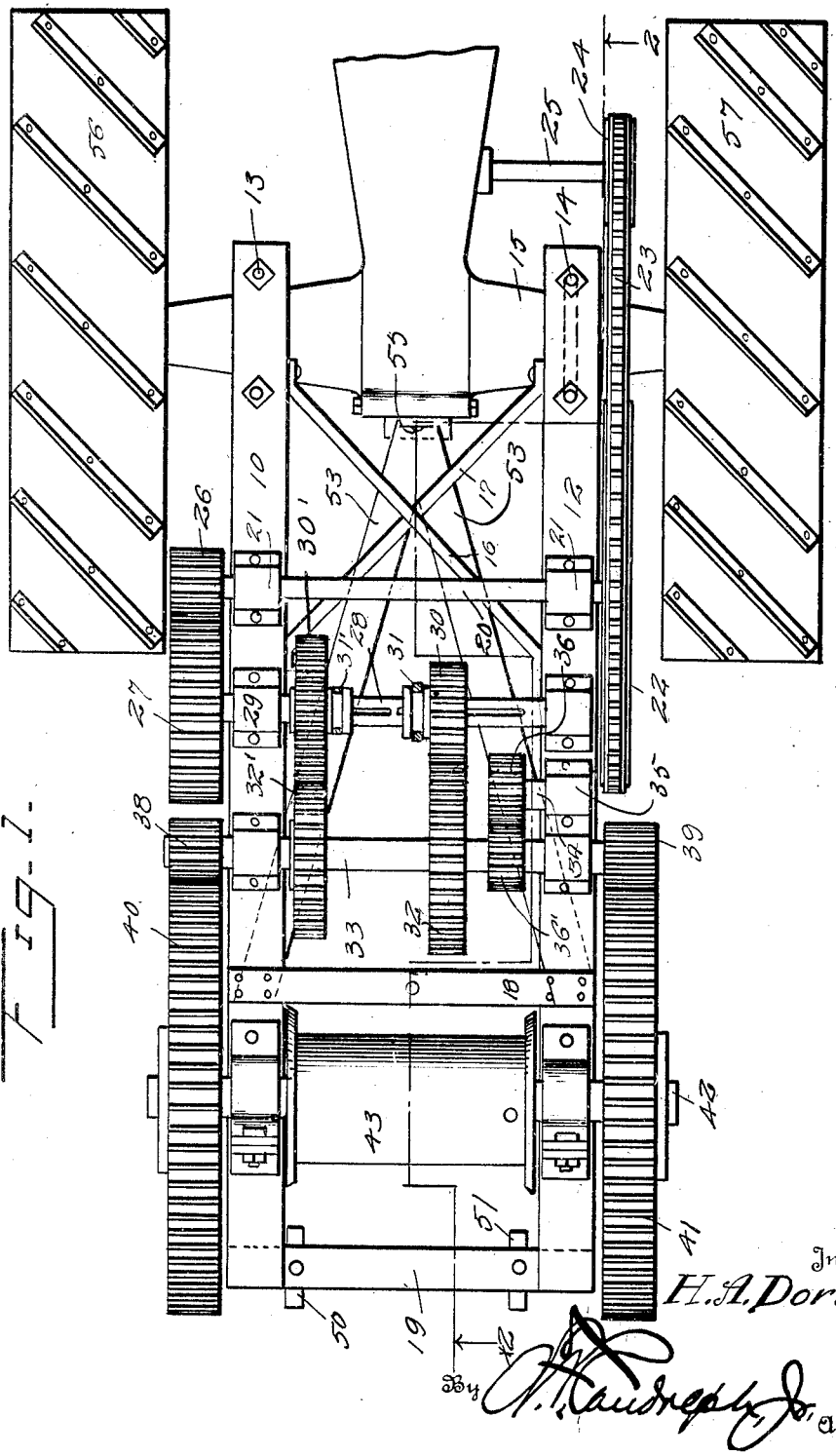

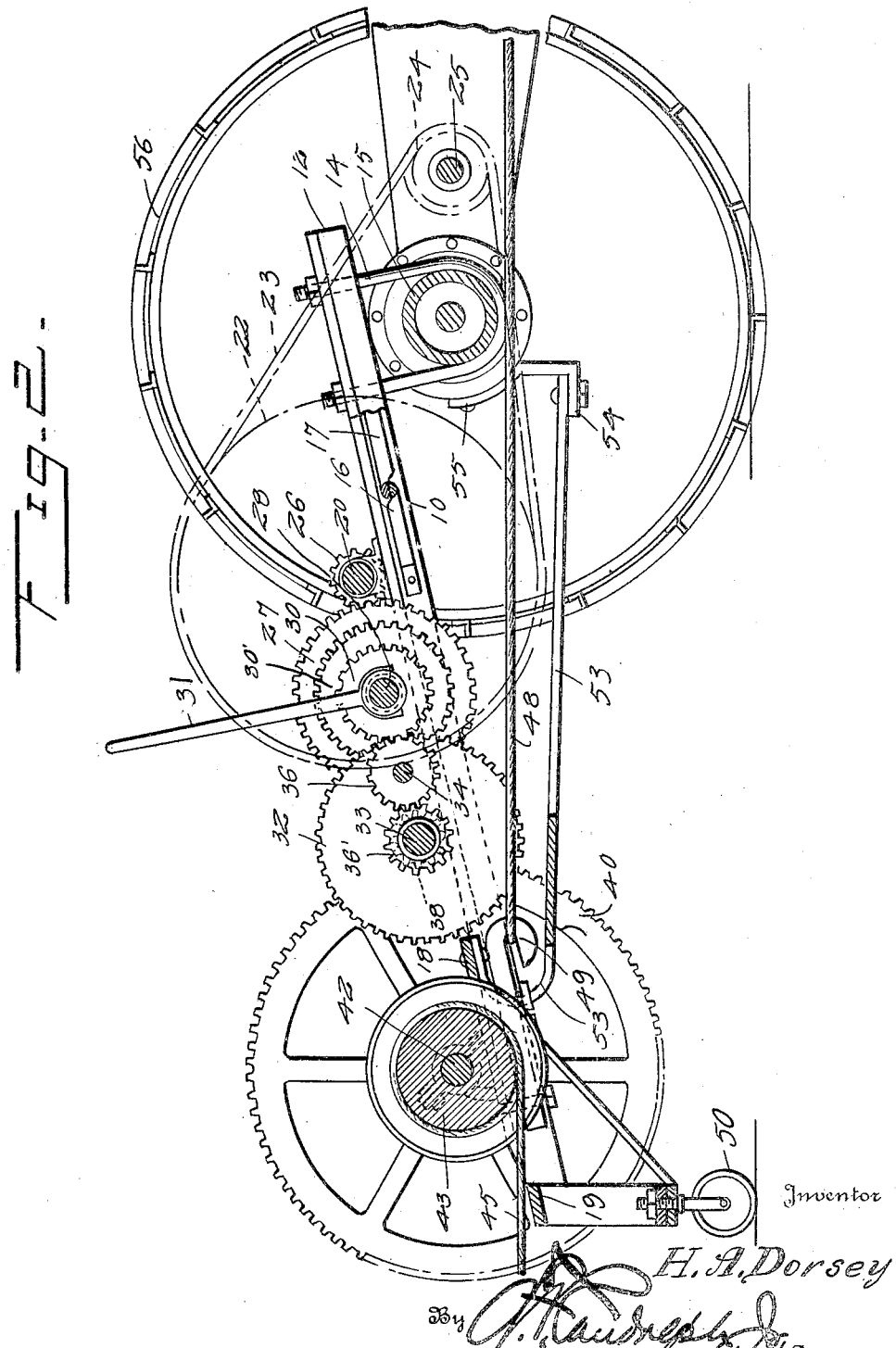

UNITED STATES PATENT OFFICE.

HENRY AUGUSTAS DORSEY, OF ENTERPRISE, ALABAMA.

STUMP PULLING AND SKIDDER ATTACHMENT FOR TRACTORS.

1,374,835.  Specification of Letters Patent.  Patented Apr. 12, 1921.

Application filed October 13, 1920. Serial No. 416,631.

*To all whom it may concern:*

Be it known that I, HENRY A. DORSEY, a citizen of the United States, residing at Enterprise, in the county of Coffee and State of Alabama, have invented certain new and useful Improvements in Stump Pulling and Skidder Attachments for Tractors; and I do hereby declare the following to be a full, clear, and exact description of the invention, such as will enable others skilled in the art to which it appertains to make and use the same.

This invention relates to a stump pulling attachment for tractors, and the object is to provide, in connection with a tractor of a standard type, an attachment which shall be complete in itself and which shall include a drum, and gearing for imparting movement to the drum from the transmission of the tractor.

A further object is to provide an attachment comprising a main frame adapted for connection with the rear axle of the tractor, the frame serving to mount a drum upon which the main cable for connection with the stump, is wound, and means for imparting movement to the drum in either direction, by a suitable gearing operatively connected with the driving mechanism of the tractor.

A still further object is to provide for greatly increasing the leverage or torsion applied to the shaft of the drum through the medium of the aforesaid gearing.

With the foregoing and other objects in view, the invention consists in the novel construction, combination and arrangements hereinafter described and claimed.

In the drawings,

Figure 1 is a top plan view of the device.

Fig. 2 is a view in vertical longitudinal section.

When the present invention is employed in connection with a tractor such as the Fordson, driving connections, (not shown) are preferably made from the transmission shaft of the tractor to the short transverse shaft 25 carrying a sprocket wheel which in turn imparts movement to the train of gearing described below.

The main frame includes a plurality of side bars 10 and 12 of channel iron connected by means of yokes or straps 13 and 14 with axle 15, or with the housing of the axle. These side bars 10 and 12 are connected by diagonal braces 16 and 17, a transverse bar or brace 18, and a rear transverse element 19.

A shaft 20 mounted in bearings 21 carries a sprocket wheel 22 driven by chain 23, this chain passing around the sprocket wheel 24 on shaft 25. A pinion 26 on shaft 20 meshes with the gear wheel 27 on shaft 28 mounted in bearings 29 on the frame. This shaft last named serves to slidably mount a pinion 30 under the control of a gear shift lever 31, the pinion meshing when in the position shown in Fig. 1, with gear wheel 32 on shaft 33, for driving the latter in a forward direction. Between the shafts 28 and 33 is provided a countershaft 34, which latter is mounted in bearings 35 and carries a gear wheel 36 meshing with the gear wheel 36' on the shaft 33 when the gear shift lever 31 is operated to bring the pinions 30 into engagement with the gear wheel 36, thereby driving the shaft 33 at approximately the same speed of rotation as the shaft 28.

The outer end of the shaft 33 projects beyond the elements 10 and 12 of the frame, and mounted on the end portions are pinions 38 and 39 meshing respectively with gear wheels 40 and 41 on transverse shaft 42. This shaft 42 serves to mount a drum 43 for winding cable 45, the gear wheels of the train just described serving to greatly increase the torque, so that sufficient power will be available for effecting the required result.

Cable 48 extending in the opposite direction passes around the engaging device or devices 49, preferably secured to the frame side bars 10 and 12 beneath the drum shaft ends 42, and as will be obvious the cable 48 may be attached to the tractor or some stationary object to brace the stump pulling and skidder attachment. The main frame is preferably inclined as shown and the rear end thereof is supported on the wheels 50 and 51 mounted in any suitable manner. A bar 53 extending centrally and longitudinally of the frame is connected at one end with transverse bar 18, and at the opposite end is connected with bracket 54 mounted as shown at 55. The usual wheels 56 and 57 of the tractor are carried by axle 15, and in applying the attachment it is only necessary to connect the yokes or straps with the housing of the axle and connect the longitudinal bar 53 in the manner indicated.

In order to permit the drum 43 to be driven in a winding direction at a speed slower than that provided for by the gears 26, 27, 30, 32, 38, 39 and 40, a gear 30' larger than the gear 30 is splined upon the shaft 28 and a gear 32' smaller than the gear 32 is fixed to the shaft 33. The gear 30' may be moved into and out of meshing engagement with the gear 32' through the medium of a shifting lever 31'.

The device may be used as a stump and log skidder, and the manner in which it may be used for this purpose should be clearly apparent to any skilled in the art.

What is claimed is:—

In an attachment for a tractor, a main frame including a plurality of side bars, means for connecting the frame to the axle of the tractor, a shaft mounted in the frame, a sprocket wheel carried by the shaft, means for driving the sprocket wheel, a drum and a shaft for mounting the drum, an intermediate shaft, a gear wheel mounted thereon, a pinion mounted on the shaft first named and of reduced diameter compared with the diameter of the gear wheel, an additional shaft, pinions mounted thereon, gear wheels of relatively large diameter compared with the pinions last named and mounted on the shaft of the drum, a countershaft, means for transmitting movement from the intermediate shaft to the additional shaft at a reduced speed, and means for transmitting movement through the countershaft to the additional shaft at approximately the speed of the intermediate shaft.

In testimony whereof I affix my signature in presence of two witnesses.

HENRY AUGUSTAS DORSEY.

Witnesses:
W. B. CAIN,
J. V. WRIGHT.